June 7, 1960 J. M. BRYE 2,939,535
ROTOR FOR SELF-STABILIZING HELICOPTER
Filed Sept. 13, 1954 2 Sheets-Sheet 1

*INVENTOR.*
JAMES M. BRYE
BY
*Knox & Knox*

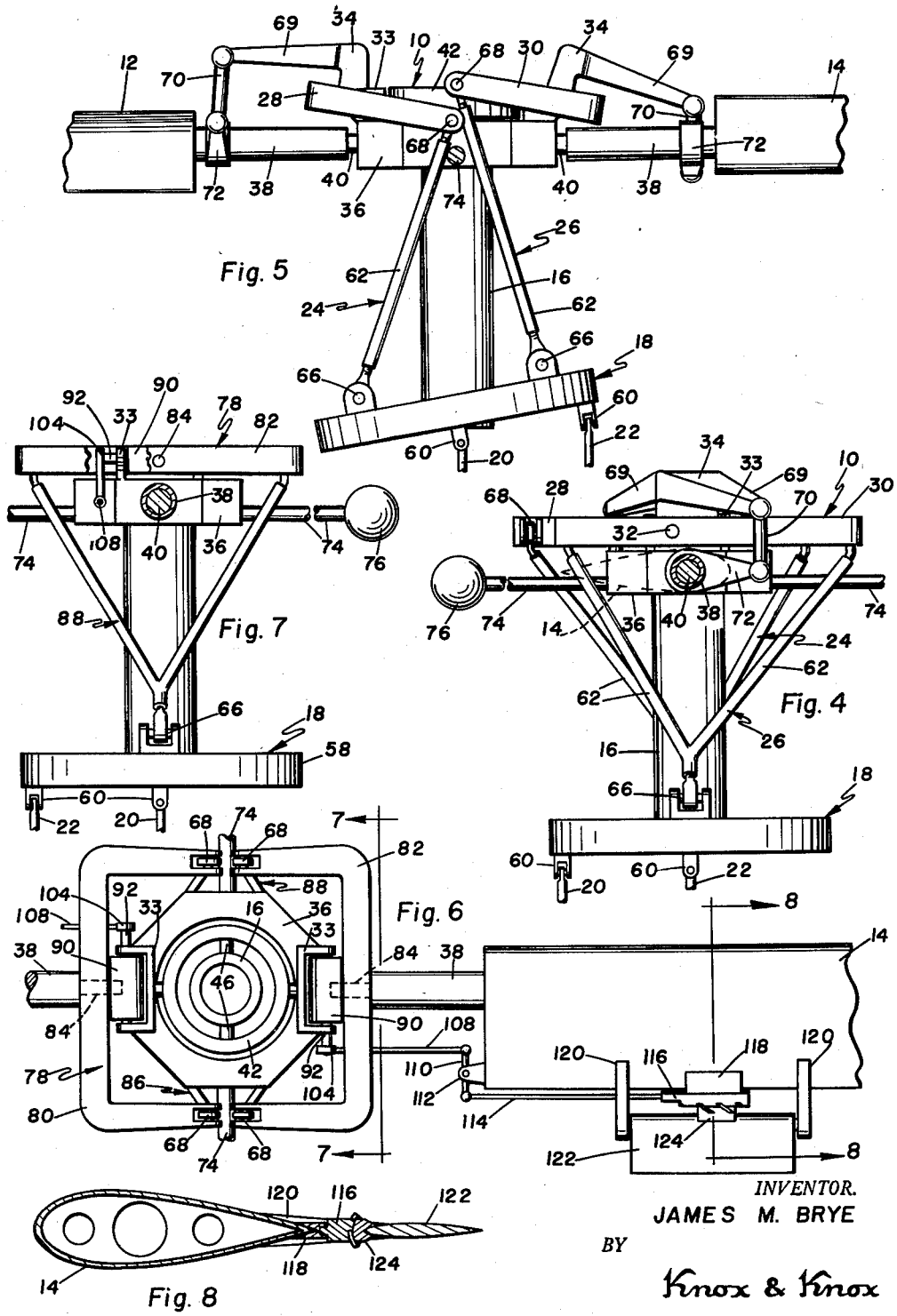

United States Patent Office 2,939,535
Patented June 7, 1960

2,939,535

ROTOR FOR SELF-STABILIZING HELICOPTER

James M. Brye, San Diego, Calif., assignor to The Ryan Aeronautical Co., San Diego, Calif., a corporation of California Filed Sept. 13, 1954, Ser. No. 455,378

12 Claims. (Cl. 170—160.25)

The present invention relates generally to aircraft and more particularly to the rotor of a self-stabilizing helicopter.

The primary object of this invention is to provide a helicopter which is inherently stable. The arrangement of the control linkages which provides effective pivots adjacent to the axis of rotor rotation reduces the effective coupling of the rotor to the aircraft, while still providing sufficient coupling for ground stability while the rotor is rotating.

Another object of this invention is to provide a helicopter rotor having a universally mounted rotor head including a novel, universally jointed rotor blade actuating mechanism.

Another object of this invention is to provide a helicopter rotor wherein the control linkages, although located outside the rotor shaft, have their effective pivotal connections to the rotor blades adjacent to the geometrical center of the rotor head.

With these and other objects definitely in view, this invention consists in the novel construction, combination and arrangement of elements and portions, as will be hereinafter fully described in the specification, particularly pointed out in the claims, and illustrated in the drawings which form a material part of this disclosure and wherein similar characters of reference indicate similar or identical elements and portions throughout the specification and throughout the views of the drawings, and in which:

Fig. 4 is a sectional view of the rotor taken on the line 4—4 of Figure 2.

Figure 5 is a side elevation view showing the control linkage in an exaggerated offset position to illustrate the function thereof.

Fig. 6 is a top plan view of a slightly modified form of the rotor for use with rotor blades actuated by servo tabs.

Fig. 7 is a sectional view of the modified structure taken on the line 7—7 of Fig. 6.

Fig. 8 is an enlarged sectional view taken on the line 8—8 of Fig. 6.

Figure 1:
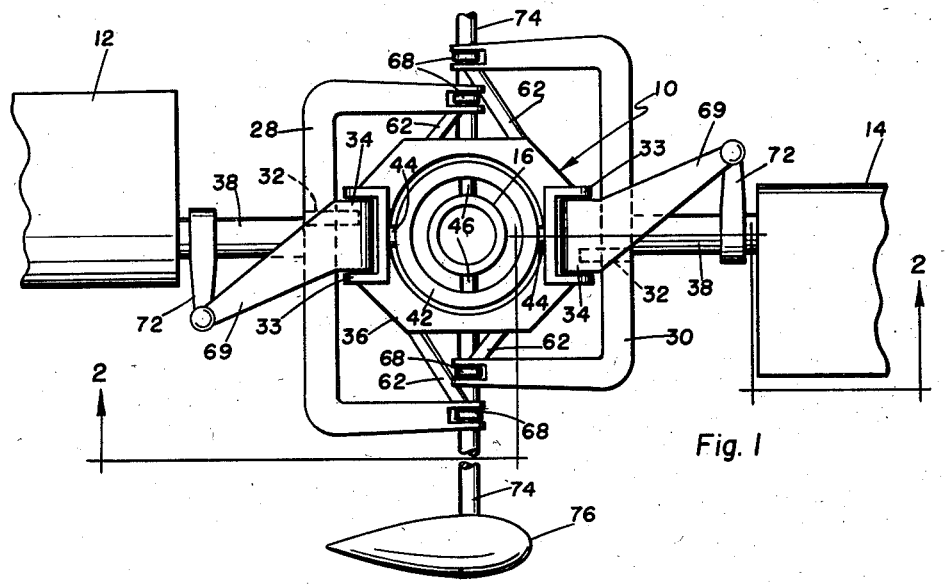
Fig. 1 is a top plan view of the rotor.

For simplicity of presentation a two bladed rotor is shown in the drawings and described hereinafter. However, the principles involved in this patent application are equally applicable to a rotor of more than two blades.

For purposes of reference, the spanwise axis of the rotor blades intersecting the axis of rotation of the rotor will hereinafter be referred to as the longitudinal axis. Similarly, the axis at right angles to the longitudinal axis, and also intersecting the axis of rotation, will be referred to as the lateral axis.

Figure 2:
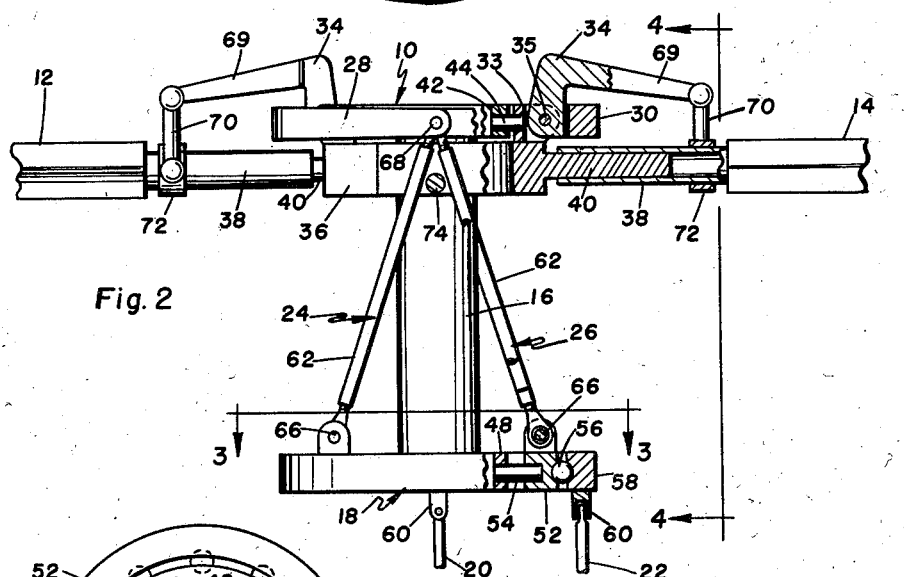
Fig. 2 is a side elevation view thereof, partially cut away.
Figure 3:
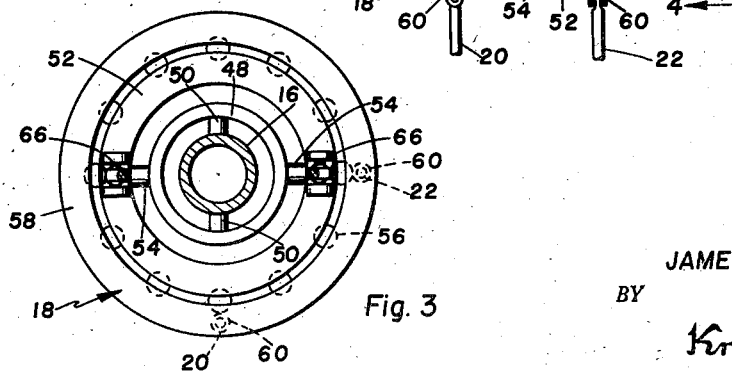
Fig. 3 is a horizontal sectional view taken on the line 3—3 of Fig. 2.

Referring now to Figs. 1–5 of the drawings, the rotor assembly includes a rotor head 10 on which are pivotally mounted rotor blades 12 and 14, said rotor head being universally mounted on the upper end of a main shaft 16, this main shaft being mounted in a suitable manner in the fuselage of a helicopter. At the lower end of the shaft 16 a conventional swash plate 18 is mounted thereon. The pitch control rod 20 and the roll control rod 22 extend from the swash plate 18. Attached to the swash plate 18 in generally diametrically opposite positions are actuating yokes 24 and 26, which extend upwardly on opposite sides of shaft 16 and are connected to the ends of substantially U-shaped ring yokes 28 and 30 respectively. These ring yokes 28 and 30 are pivotally mounted on pins 32 which are parallel to the longitudinal axis and are integral with or fixed to rocker arms 34, which in turn are pivotally mounted in pillow blocks 33 by means of pins 35 parallel to the lateral axis.

The rotor head 10 comprises a main ring member 36 having diametrically opposite, extended stub shafts 40. The root sleeves 38 of the rotor blades 12 and 14 are mounted on the stub shafts 40 and the rotor blades 12 and 14 are thus pivotal on their spanwise axes which, as previously mentioned, are coincident with the longitudinal axis of the rotor. The pillow blocks 33 are fixedly secured to the upper surface of the ring member 36 in diametrically opposed positions and said ring member 36 is pivotally attached to an intermediate ring 42 by diametrically opposed pins 44 located on the longitudinal axis and journalled in the pillow blocks 33, so that the ring member is suspended slightly below said intermediate ring. The intermediate ring 42 is further pivotally attached to the shaft 16 by diametrically opposed pins 46 located on the lateral axis. The rotor head 10 is thus universally mounted on the shaft 16 by means of a Cardan cross structure. It should be understood, however, that the mounting is not limited to such a structure, various universal mountings such as a ball joint or the like being equally suitable, as will be evident from further disclosure hereafter.

The swash plate 18 comprises an inner ring 48 which is pivotally mounted on the lower end of the shaft 16 by means of diametrically opposed pins 50. Surrounding the inner ring 48 is an intermediate ring 52, pivotally attached to said inner ring by diametrically opposed pins 54 at right angles to the pins 50. Fitted around the intermediate ring 52 and coplanar therewith is an outer ring 58 mounted on a suitable bearing 56. Thus the intermediate ring 52 is universally mounted on the shaft 16 by a Cardan cross structure and is rotatable within the outer ring 58. It should be understood, however, that the mounting of the intermediate ring 52 is not limited to such a structure, various universal mountings such as a ball joint or the like being equally suitable. The pitch control rod 20 is secured to the outer ring 58 by a universal joint 60 in line with the transverse axis of the aircraft, and the roll control rod 22 is attached to the outer ring 58 by a further universal joint 60 in line with the fore-aft axis of the aircraft. This location of the pitch control rod 20 and the roll control rod 22 is unconventional. Usually the pitch control rod is on the fore-aft axis and the roll control rod is on the transverse axis respectively of the aircraft. In operation, it should be noted that the outer ring 58 remains stationary relative to the aircraft while the remainder of the swash plate structure rotates with the shaft 16.

The actuating yokes 24 and 26 each comprise a nearly symmetrically V-shaped structure having arms 62 joined at their lower ends. These yokes are attached at their lower ends to the intermediate ring 52 by means of ball joints 66 which are on the longitudinal axis. They are attached at their upper ends to the ends of the ring yokes 28 and 30 by joints 68. All four joints 68 are on the lateral axis.

The rocker arms 34 are generally L-shaped and have arms 69 which extend outwardly above the ring yokes 28 and 30. The inner ends of the rocker arms 34 are pivoted in the pillow blocks 33 by the pins 35, while the outer ends of the arms 69 are universally connected to links 70 which, in turn, are universally connected to fixed arms 72 extending from the root sleeves 38 of rotor blades 12 and 14, generally in alignment with the chord axes of the rotor blades 12 and 14. The ring yokes 28 and 30 are pivotally attached to the inner portions of the rocker arms by the pins 32, and it should be noted that these pins, although parallel to the longitudinal axis, are each offset from that axis toward the trailing edge of the adjacent rotor blade, as shown in Fig. 4.

When the rotor is limited to two blades as shown in the drawings, additional inertia is desirable normal to the rotor blade span axis or longitudinal axis to prevent random cyclic pitch changes about the pins 44. This inertia is provided by inertia bars 74 carrying inertia weights 76 at their outer ends, said inertia bars extending from the ring member 36 at right angles to the stub shafts 40. These inertia bars and weights are not required in rotors having more than two blades.

The yoke structure described herein enables the effective pivotal connections of the actuating yokes 24 and 26 to the rotor blades 12 and 14 to be located adjacent the axis of rotation. These effective pivotal connections are defined by the intersection of the axes of the pins 32, on which the ring yokes 28 and 30 are pivoted, with the lateral axis, on which the joints 68 are located. These theoretical pivot points, which hereinafter will be referred to as the effective pivot points, of the two yoke assemblies are thus adjacent the geometrical center of the universally mounted rotor head 10 but are offset on opposite sides thereof. The slight lateral offset of these effective pivot points, caused by the offset of the pins 32, slightly reduces the in-flight stability while giving some necessary positive ground stability, as will hereinafter be apparent.

The inherent in-flight stability of the rotor which is gained by locating the effective pivot points adjacent the axis of rotation is fully described in co-pending application Serial No. 412,539, filed February 25, 1954, now abandoned. For reference purposes it should be mentioned that in the above identified co-pending application the pivot points are actually located adjacent the axis of rotation by utilizing actuating rods within the main rotor shaft. The actuating yokes 24 and 26 of the present application are the equivalent of such actuating rods and, by way of the novel yoke structure, provide pivot points which are also effectively located adjacent the axis of rotation.

The inherent in-flight stability of the rotor may best be understood by assuming that the effective pivot points are coincident on the geometrical center of the rotor head 10. With this arrangement, any displacement of the shaft 16, or the aircraft, from vertical alignment with the rotor plane of rotation will be resisted by the rotating rotor blades which tend, because of their inertia, to remain in their initial plane of rotation, the vertical thrust of the rotor tending to return the shaft 16 to its vertical alignment therewith. Thus the rotor gives a self-stabilizing action to the helicopter. Assuming that the effective pivot points are coincident on the geometrical center of the rotor head 10 is equivalent to assuming that the pins 32 are located on the longitudinal axis instead of being offset therefrom. As such, when the aircraft is swinging under the longitudinal axis, the ring yokes 28 and 30 would freely pivot on the pins 32. Similarly, when the aircraft is swinging under the lateral axis, the upper ends of the actuating yokes 24 and 26 would swing freely about the joints 68. The pins 32 and the joints 68 being effectively on the longitudinal and lateral axes respectively no motion would be transferred to the rocker arm 34 and hence the blades would not change their pitch, either collectively or cyclically. Therefore they would not tend to depart from their initial plane of rotation. This is the same stabilizing action which would take place if the universal joints were physically located at the geometric center of the rotor hub.

Under these circumstances the rotor is completely isolated from the aircraft. This effective isolation of the rotor from the aircraft is not advantageous when the aircraft is at rest, as on the ground, the rotor no longer having the inherent tendency to remain perpendicular to the aircraft and consequently requiring constant control effort to retain ground stability. For the above reasons the effective pivot points are thus spaced slightly from the axis of rotation, although the spacing is not sufficient to destroy the inherent flight stability.

In operation, the entire rotor assembly, the shaft 16 and the swash plate 18 rotates as a unit with the exception of the outer ring 58. Thus any tilting of the outer ring 58 relative to the shaft 16 causes the intermediate ring 52 to rotate in an inclined plane, and thus causes the actuating yokes 24 and 26 to oscillate vertically during rotation. This action is illustrated in Fig. 5 in which the roll control rod 22, which is located on the fore-aft axis of the aircraft, has been lifted. This causes a downward displacement of the actuating yoke 24 which tilts the ring yoke 28, so raising the attached rocker arm 34 which, through the link 70, lifts the arm 72 and puts the rotor blade 12 at a positive angle of attack. It will be obvious that the downward displacement of the other rocker arm 34 will correspondingly put the rotor blade 14 at a negative angle of attack. This pitching oscillation of the rotor blades 12 and 14 occurs once each revolution of the rotor and constitutes the normal cyclic pitching operation. Since, in normal operation, the rotor blades 12 and 14 reach a maximum flapping deflection approximately 90° of rotor rotation after maximum blade pitch is attained, this flapping deflection being caused by the aerodynamic lift on the rotor blades due to their pitch angles, the maximum blade flapping would be on the transverse axis of the aircraft, i.e., the rotor has been tilted sideways. This was the desired result since the roll control rod 22 was actuated.

The inherent ground stability of the mechanism due to the lateral offset of pins 32 may be understood by considering the case when the shaft 16 is vertical and the rotor plane of rotation is tilted so that the right hand side of the ring member 36 would be raised from the position shown in Fig. 4. If no pitch change were introduced by the pilot into the rotor blades and if pins 32 were not offset from the lateral axis, then the system consisting of rotor blades 12 and 14, inertia bars 74 with weights 76, main ring member 36 with extended stub shafts 40, pillow blocks 33, pins 35, rocker arms 34, links 70 and arms 72 would all be tilted as one body. However, the axis through joints 68 is not itself moved vertically because the main shaft 16 and swash plate 18 have remained unmoved. As a result of the tilting of the rotor head 10 as mentioned above, the axis of pin 32, of the actuating mechanism for the rotor blade 14, is lowered from its initial position. Since the joints 68 are vertically stationary, relative to the rotor head, this lowering of pin 32 causes tilting of the ring yoke 30 such as to put the blade 14 into a negative pitch. Because of this reduced pitch that blade will reach its maximum downward flapping displacement after a further 90° of rotor rotation. This direction of blade flapping is such as to return the plane of rotation toward being perpendicular to the shaft 16. Thus the lateral offset of pins 32 acts to give the rotor a tendency to remain perpendicular to the shaft 16. The actual amount of the offset would be determined to suit the particular rotor.

It is important to note that the center of weight of the system, consisting of the main ring member 36 with its extended stub shafts 40 and inertia bars 74 with weights 76 and of rotor blades 12 and 14, is vertically coincident with the geometric center of the rotor hub universal mounting. This is possible because the rotor blades 12 and 14 normally cone upwardly during rotation so that part of their weight is above the rotor hub universal mounting. Thus, when there is any motion of this itemized rotor system about pins 44 or 46, there is no displacement of its center of weight. Thus there is no vibration due to whirling of an off-center weight.

The above described structure is suitable for rotors in which the rotor blades are actuated directly from the actuating mechanism. Certain types of rotors have blades which are actuated by small servo tabs mounted on the blades, the servo tabs themselves being controlled by the actuating mechanism. A modified form of the structure, suitable for use with servo tab actuated rotors, is shown in Figs. 6–8.

In this particular structure the rotor head 78 is substantially similar to the rotor head 10 and is mounted in a similar manner on the shaft 16. The swash plate 18 is also used together with the pitch control rod 20 and roll control rod 22. For a reason to be explained later, the pitch and roll control rods 20 and 22 are exchanged with respect to the direct blade control system. The ring yokes 80 and 82 differ from the ring yokes 28 and 30 in that their pivot pins 84 are aligned on the longitudinal axis as shown in Fig. 7, instead of being offset as are the pins 32. They also differ in that the axis of the two joints 68 of each ring yoke is offset from the lateral axis as shown in Fig. 6. The purpose of this offset is similar to the purpose of the offset of pins 32 in the arrangement for direct blade pitch control. These changes result in ring yokes 80 and 82 being completely symmetrical. Consequently the actuating yokes 86 and 88 are also symmetrical, as is apparent in Fig. 7, said actuating yokes being attached to the intermediate ring 52 by ball joints 66 as in the previously described rotor.

The rocker arms 34 are, however, replaced by journal blocks 90 which are pivotally mounted in the pillow blocks 33 on pins 92. These pins 92 are fixed in the journal blocks 90 and extend from the pillow blocks in the direction of the rotor blade trailing edges. Fixed to these extensions of pins 92 are levers 104 which depend closely alongside the pillow blocks 33 as shown in Figs. 6 and 7. Universally attached to the lower end of each lever 104 is a connecting rod 108, the other end of which is universally attached to one end of a rocker bar 110, said rocker bar being intermediately pivoted in a bracket 112 mounted on the root end of the respective rotor blade.

Secured to each rocker bar 110 is a tension rod or cable 114 which extends along the trailing edge of the rotor blade and is attached to a helical rack 116, longitudinally slidable in a guide 118 mounted on the rotor blade itself. Also secured to each rotor blade are spaced hinge members 120 between which is pivotally mounted a servo tab 122. On the leading edge of the servo tab 122 is a helical gear segment 124 which engages the helical rack 116. The helical rack 116 and helical gear segment 124 have a steeply pitched thread so that longitudinal movement of the helical rack causes pivotal motion of the servo tab 118. The helical rack 116 is biased outwardly by the centrifugal force acting on its own mass during rotor rotation.

In operation, any tilting of the swash plate 18 causes vertical movement of the ring yokes 80 and 82 which, through the levers 104, connecting rods 108 and rocker bars 110, actuate the helical racks 116 to cyclically change the pitch of the servo tabs 122. The servo tabs 122 in turn actuate the rotor blades in the normal manner, the aerodynamics involved being well known to those skilled in the art.

It will be seen that in this particular structure the effective pivot points are offset from the axis of rotation on the longitudinal or blade span axis, rather than laterally offset as in the first described structure. The effective pivot points are, in this case, located on the axes of the joints 68 where intersected by the longitudinal axis. The longitudinal offset is necessary due to the fact that rotor blades having servo tab actuators reach their maximum flapping deflection 180° of rotor rotation after the maximum tab pitch change. In the direct blade control there is only a 90° lag between the rotor blade azimuth of maximum rocker arm 34 displacement and the rotor blade azimuth of maximum rotor tilt or maximum flapping displacement as previously explained. This lag angle is now 180° because the 90° lag occurs twice, once between tab displacement and rotor blade pitch and again between the rotor blade pitch and the rotor tilt. For this reason the relative positions of the pitch control rod 20 and roll control rod 22 are changed, so that the pilot's control movements are unchanged and produce the required actions of the rotor despite the increased lag in operation. In other words, the pilot's control actions are advanced an additional 90° of rotor rotation to compensate for the additional 90° of lag.

It should be understood that the actual structures illustrated in the drawings are exemplary, the entire mechanism being constructed according to accepted aircraft standards.

The structures shown are particularly suitable for driven shaft type rotors, although with minor modification, the structure could also be applied to tip driven rotors. The rotor head structure could, in this instance, be a simple ball joint or the like. The primary novelty of the invention is the inherent stability obtained by locating the effective pivot points of the rotor control system adjacent to the geometric center of a universally mounted rotor head.

The operation of this invention will be clearly comprehended from a consideration of the foregoing description of the mechanical details thereof, taken in connection with the drawings and the above recited objects. It will be obvious that all said objects are amply achieved by this invention.

Further description would appear to be unnecessary.

It is understood that minor variation from the forms of the invention disclosed herein may be made without departure from the spirit and scope of the invention, and that the specification and drawings are to be considered as merely illustrative rather than limiting.

I claim:

1. In a helicopter rotor, a supporting shaft, a rotor head universally mounted on said shaft, rotor blades attached to said rotor head and being pivotal on their longitudinal axes only, actuating means mounted externally of and straddling said shaft for movement substantially parallel to the axis of the shaft, linkage means mounted on said rotor head and operatively connecting said actuating means to said rotor blades for pitch adjustment thereof, the effective pivotal connections of said actuating means to said linkage means being adjacent the geometrical center and within the physical limits of said rotor head, a swash plate universally mounted in axial alignment with said rotor head, said actuating means being operatively mounted on said swash plate.

2. In a helicopter rotor, a supporting shaft, a rotor head universally mounted on said shaft, rotor blades attached to said rotor head and being pivotal on their longitudinal axes, bifurcated actuating yokes mounted for movement substantially parallel to the axis of said shaft, ring yokes pivotally attached to the bifurcated ends of said actuating yokes, rocker arm and linkage means pivotally mounted on said rotor head and operatively connecting said ring yokes to said rotor blades for pitch adjustment thereof, the effective pivotal connections of said actuating yokes to said rotor blades being adjacent the geometrical center of said rotor head, a swash plate universally mounted in axial alignment with said rotor head, said actuating yokes being operatively mounted on said swash plate.

3. In a helicopter rotor, a supporting shaft, a rotor head universally mounted on said shaft, rotor blades attached to said rotor head and being pivotal on their longitudinal axes, bifurcated actuating yokes mounted for movement substantially parallel to the axis of said shaft, ring yokes pivotally attached to the bifurcated ends of said actuating yokes, rocker arm and linkage means pivotally mounted on said rotor head and operatively connecting said ring yokes to said rotor blades for pitch adjustment thereof, the effective pivotal connections of said actuating yokes to said rotor blades being adjacent the geometrical center of said rotor head, a swash plate universally mounted in axial alignment with said rotor head, said actuating yokes being pivotally attached to said swash plate.

4. A helicopter rotor according to claim 2 wherein said linkage means comprises links universally interconnecting said rocker arms and said rotor blades.

5. In a helicopter rotor, a supporting shaft, a rotor head universally mounted on said shaft, rotor blades attached to said rotor head and being pivotal on their longitudinal axes, bifurcated actuating yokes mounted for movement substantially parallel to the axis of said shaft, ring yokes pivotally attached to the bifurcated ends of said actuating yokes, rocker arms pivotally mounted on said rotor head, said ring yokes being pivotally mounted on said rocker arms, their pivotal axes being substantially parallel to the pivotal axes of said rotor blades and laterally offset therefrom, links universally interconnecting said rocker arms to said rotor blades for pitch adjustment thereof, the effective pivotal connections of said actuating yokes to said rotor blades being adjacent the geometrical center of said rotor head, a swash plate universally mounted in axial alignment with said rotor head, said actuating yokes being pivotally attached to said swash plates.

6. A helicopter rotor according to claim 3 wherein the effective pivotal connections of said actuating yokes to said rotor blades are spaced from the geometrical center of said rotor head on an axis substantially at right angles to the pivotal axes of their respective interconnected rotor blades.

7. A helicopter rotor according to claim 3 wherein said actuating yokes are connected to diametrically opposed points on said swash plate; said diametrically opposed points being on a plane extending through the axis of said shaft and through the pivotal axes of said rotor blades.

8. In a helicopter rotor, a supporting shaft, a rotor head universally mounted on said shaft, rotor blades attached to said rotor head and being pivotal on their longitudinal axes, bifurcated actuating yokes mounted for movement substantially parallel to the axis of said shaft, pillow blocks fixed to said rotor head, rocker arms pivotally mounted in said pillow blocks on axes substantially normal to the pivotal axes of said rotor blades, ring yokes pivotally mounted on said rocker arms on axes substantially parallel to the pivotal axes of said rotor blades and laterally offset therefrom, said ring yokes being pivotally connected to the bifurcated ends of said actuating yokes, links universally interconnecting said rocker arms to said rotor blades for pitch adjustment thereof, the effective pivotal connections of said actuating yokes to said rotor blades being adjacent the geometrical center of said rotor head, a swash plate universally mounted in axial alignment with said rotor head, said actuating yokes being pivotally attached to said swash plate.

9. In a helicopter rotor, a supporting shaft, a rotor head universally mounted on said shaft, rotor blades attached to said rotor head and being pivotal on their longitudinal axes, bifurcated actuating yokes mounted for movement substantially parallel to the axis of said shaft, ring yokes pivotally attached to the bifurcated ends of said actuating yokes, servo flaps extending parallel to said rotor blades and pivotally mounted thereon, journal blocks pivotally attached to said rotor head, said ring yokes being pivotally mounted on said journal blocks, and linkage means operatively connecting said journal blocks to said servo flaps for pitch adjustment thereof, the effective pivotal connections of said actuating yokes to said ring yokes being adjacent the geometrical center of said rotor head and spaced therefrom in alignment with the longitudinal axes of their respective interconnected rotor blades, a swash plate universally mounted in axial alignment with said rotor head, said actuating yokes being pivotally attached to said swash plate.

10. A helicopter rotor according to claim 9 wherein said linkage means includes torsion means on said servo flaps, and longitudinally reciprocable links operatively connecting said torsion means to said journal blocks to effect pivotal movement of said servo flaps.

11. A helicopter rotor according to claim 9 wherein said actuating yokes are connected to diametrically opposed points on said swash plate; said diametrically opposed points being on a plane extending through the axis of said shafts and through the pivotal axes of their respective interconnected rotor blades.

12. In a helicopter rotor, a supporting shaft, a rotor head universally mounted on said shaft, rotor blades attached to said rotor head and being pivotal on their longitudinal axes, bifurcated actuating yokes mounted for movement substantially parallel to the axis of said shaft, pillow blocks fixed to said rotor head, journal blocks pivotally mounted in said pillow blocks on axes normal to the pivotal axes of said rotor blades, ring yokes pivotally mounted on said journal blocks on axes substantially parallel to the pivotal axes of said rotor blades and vertically aligned therewith, said ring yokes being pivotally connected to the bifurcated ends of said actuating yokes, servo flaps extending parallel to said rotor blades and pivotally mounted thereon, and linkage means operatively connecting said journal blocks to said servo flaps for pitch adjustment thereof, the effective pivotal connections of said actuating yokes to said ring yokes being adjacent the geometrical center of said rotor head and spaced therefrom in alignment with the longitudinal axes of their respective interconnected rotor blades, a swash plate universally mounted in axial alignment with said rotor head, said actuating yokes being pivotally attached to said swash plate.

References Cited in the file of this patent

UNITED STATES PATENTS

| 2,256,635 | Young | Sept. 23, 1941 |
| 2,352,342 | Pitcairn | June 27, 1944 |
| 2,670,051 | Hohenemser | Feb. 23, 1954 |